(12) United States Patent
Kordosky et al.

(10) Patent No.: US 7,799,294 B2
(45) Date of Patent: Sep. 21, 2010

(54) METHODS FOR IMPROVING THE RECOVERY OF METAL LEACHING AGENTS

(75) Inventors: Gary A. Kordosky, Tucson, AZ (US); Andrew Nisbett, Tucson, AZ (US)

(73) Assignee: Cognis IP Management GmbH, Duesseldorf (DE)

( * ) Notice: Subject to any disclaimer, the term of this patent is extended or adjusted under 35 U.S.C. 154(b) by 1293 days.

(21) Appl. No.: 10/895,794

(22) Filed: Jul. 21, 2004

(65) Prior Publication Data

US 2005/0031512 A1 Feb. 10, 2005

Related U.S. Application Data

(60) Provisional application No. 60/491,311, filed on Jul. 30, 2003.

(51) Int. Cl.
*C22B 3/00* (2006.01)

(52) U.S. Cl. .................. 423/24; 423/658.5

(58) Field of Classification Search .............. 423/24, 423/27, 99, 139, 658.5; 205/580, 581, 582, 205/583, 589
See application file for complete search history.

(56) References Cited

U.S. PATENT DOCUMENTS

| | | | |
|---|---|---|---|
| 5,316,567 A | 5/1994 | Jones | |
| 5,895,633 A | 4/1999 | King | |
| 5,919,674 A | 7/1999 | Tunley | |
| 6,171,564 B1 | 1/2001 | Jones | |
| 6,451,088 B1 * | 9/2002 | Marsden et al. | 75/739 |
| 6,680,034 B2 * | 1/2004 | Marsden et al. | 423/24 |
| 2002/0034465 A1 * | 3/2002 | Marsden et al. | 423/27 |
| 2003/0124040 A1 * | 7/2003 | Jones | 423/24 |

FOREIGN PATENT DOCUMENTS

WO 00/06784 * 2/2000

OTHER PUBLICATIONS

King, et al., "Autoclaving of Copper Concentrates" Proceedings of COPPER 95-COBRE Int'l Conf., vol. III, pp. 511-533 (1995).*
Bartlett, R. W., "Solution Mining: Leaching and Fluid Recovery of Materials," Gordon and Breach Publishers, pp. 80-81 (1992).*
Official Opening of the Tailings Leach Plant Stage III Nchanga Division, Zambia Consolidated Copper Mines Limited Brochure, Sep. 25, 1986, pp. 1-12.
Hopkins, et al, "Anamax Oxide Plant: A New US Dimension in Solvent Extraction", Reprinted from Engineering & Mining Journal, McGraw Hill, Inc., (Feb. 1977), pp. 1-9.
"Zinc Solvent Extraction in the Process Industries", P.M. Cole and K.C. Sole, Mineral Processing & Extractive Metallurgy Reviews, 24, 91-137, 2003.
"Ammoniacal Solvent Extraction Process at Queensland Nickel, Process Installation and Operation", J.G. Reid and M.J. Price, Solvent Extraction in the Process Industries, vol. 1, pp. 225-231, Proceedings of ISEX '93, Ed. D.H. Logsdail and M.J. Slater, published for SCI by Elsevier Applied Science, London and New York.

* cited by examiner

*Primary Examiner*—Steven Bos

(57) ABSTRACT

Processes for metal leaching/solvent extraction are described which comprise: (a) providing a first aqueous leach pulp which comprises a mixture of leached solids and an aqueous leach solution comprising a metal, a leaching agent and water; (b) subjecting the first aqueous leach pulp to a first solid-liquid separation to provide a first clarified aqueous leach solution and a second aqueous leach pulp, wherein the second aqueous leach pulp comprises the leached solids at a % solids level greater than the first pulp; (c) subjecting the first clarified aqueous leach solution to a first solvent extraction prior to any significant dilution, whereby a first aqueous raffinate is obtained; (d) subjecting the second aqueous leach pulp to a second solid-liquid separation with dilution via an aqueous stream to obtain a second clarified aqueous leach solution; and (e) subjecting the second clarified aqueous leach solution to a second solvent extraction whereby a second aqueous raffinate is obtained.

23 Claims, 2 Drawing Sheets

METHODS FOR IMPROVING THE RECOVERY OF METAL LEACHING AGENTS

CROSS-REFERENCE TO RELATED APPLICATIONS

This application claims priority, under 35 U.S.C. §119(e), of U.S. Provisional Patent Application No. 60/491,311, filed on Jul. 30, 2003, the entire contents of which are hereby incorporated by reference.

BACKGROUND OF THE INVENTION

Most metals are obtained by removing those metal values from the ores in which they are found in the ground. Once the ore has been mined, the metal must then be separated from the remainder of the ore. One method to separate the metal from the ore is known as leaching. In general, the first step in this process is contacting the mined ore with an aqueous solution containing a leaching agent which extracts the metal from the ore into solution. For example, in copper leaching operations, such as, for example, in the agitation leaching of copper oxide ores, sulfuric acid in an aqueous solution is contacted with copper oxide minerals. During the leaching process, acid in the leach solution is consumed and copper is dissolved thereby increasing the copper content of the aqueous solution.

The aqueous leach solution containing the leached metal can then be treated via a known process referred to as solvent extraction wherein the aqueous leach solution is contacted with a nonaqueous solution containing a metal-specific extraction reagent. The metal-specific extraction reagent extracts the metal from the aqueous phase into the non-aqueous phase. During the solvent extraction process for copper and certain other metals, the leaching agent is regenerated in the aqueous phase. In the case where sulfuric acid is the leaching agent, sulfuric acid is regenerated in the aqueous phase when copper is extracted into the organic phase by the extraction reagent. Normally, for every ton of copper removed from the leach solution about 1.5 tons of sulfuric acid is generated in the leach solution.

Leaching agents are often recycled back to the leaching process to dissolve more metal and the more leaching agent that can be recycled the less that needs to be obtained from another source. In a standard agitation leaching process for copper, followed by solvent extraction, the leach solution is diluted to a lesser or greater extent with water in conjunction with the solid-liquid separation process needed to provide a clarified leach liquor and tailings. The diluted clarified leach solution is then transferred to one or more solvent extraction plants depending on the volume of leach solution and the capacity of each plant. The diluted leach solution undergoes solvent extraction wherein copper is removed from, and the sulfuric acid concentration is increased in, the aqueous phase. A portion of this copper-depleted, acid-containing aqueous phase, now called the raffinate, is then recycled back to the leaching process. The other portion is recycled back to the front of the solid-liquid separation process where it dilutes the leach solution exiting the agitation leaching process. Depending on the acid balance across the whole process some of this recycled aqueous phase may be partially neutralized.

The leach solution from an agitation leach process is normally diluted during the solid-liquid separation step in order to maximize the washing of the leached solids so that metal lost to the solids is minimized. During solvent extraction as the metal is extracted, acid concentration builds in the aqueous phase and the reaction becomes self-limiting in equilibrium. However, because of the initial dilution to maximize metal recovery from the leached solids, the amount of acid regenerated is lower in concentration than it would have been if the leach solution had not been diluted in the washing of the leached solids. Unfortunately, the lower the concentration of acid in the recycled raffinate, the more fresh acid that needs to be added and this increases the cost of the operation.

Accordingly, there is a need in the art for improved processes for metal leaching and solvent extraction, wherein the recovery of leaching agents is improved without negatively affecting metal recovery.

BRIEF SUMMARY OF THE INVENTION

The present invention relates, in general, to metal leaching operations and methods of improving the recovery of leaching agents from solvent extraction operations.

It has been surprisingly discovered that by splitting an aqueous leach solution into two or more portions and subjecting at least one portion to solvent extraction prior to any significant dilution and also subjecting at least one other portion to solvent extraction after dilution, (also referred to herein as a "split circuit"), that good, and even optimum, metal extraction can be achieved while significantly improving the recovery of the leaching agent.

One embodiment of the present invention includes processes which comprise: (a) providing a first aqueous leach pulp which comprises a mixture of leached solids and an aqueous leach solution comprising a metal, a leaching agent and water; (b) subjecting the first aqueous leach pulp to a first solid-liquid separation to provide a first clarified aqueous leach solution and a second aqueous leach pulp, wherein the second aqueous leach pulp comprises the leached solids at a % solids level greater than the first pulp; (c) subjecting the first clarified aqueous leach solution to a first solvent extraction prior to any significant dilution, whereby a first aqueous raffinate is obtained; (d) subjecting the second aqueous leach. pulp to a second solid-liquid separation with significant dilution via an aqueous stream to obtain a second clarified aqueous leach solution; and (e) subjecting the second clarified aqueous leach solution to a second solvent extraction whereby a second aqueous raffinate is obtained.

In many of the preferred embodiments of the present invention, the metal comprises copper. Also, in many preferred embodiments of the present invention, the leaching agent comprises sulfuric acid. In more preferred embodiments of the present invention, the metal comprises copper and the leaching agent comprises sulfuric acid.

Another embodiment of the present invention includes processes which comprise: (a) providing a first aqueous leach pulp obtained from agitation leaching process, wherein the first aqueous leach pulp comprises a mixture of leached solids and an aqueous leach solution comprising copper, sulfuric acid and water; (b) subjecting the first aqueous leach pulp to a first solid-liquid separation to provide a first clarified aqueous leach solution and a second aqueous leach pulp, wherein the second aqueous leach pulp comprises the leached solids at a % solids level greater than the first pulp; (c) subjecting the first clarified aqueous leach solution to a first solvent extraction prior to any significant dilution, whereby a first aqueous raffinate is obtained; (d) subjecting the second aqueous leach pulp to a second solid-liquid separation with significant dilution via an aqueous stream to obtain a second clarified aqueous leach solution, wherein the concentration of the metal in the first clarified aqueous leach solution is greater than the concentration of the metal in the second clarified aqueous leach solution; (e) subjecting the diluted second portion to a second solvent extraction whereby a second aqueous raffinate is obtained; wherein the aqueous stream for diluting the second aqueous leach pulp comprises at least a portion of the second aqueous raffinate; and (f) recycling at least a portion of the first aqueous raffinate and at least a portion of the second aqueous raffinate to the leaching process.

DETAILED DESCRIPTION OF THE INVENTION

Figure 1:
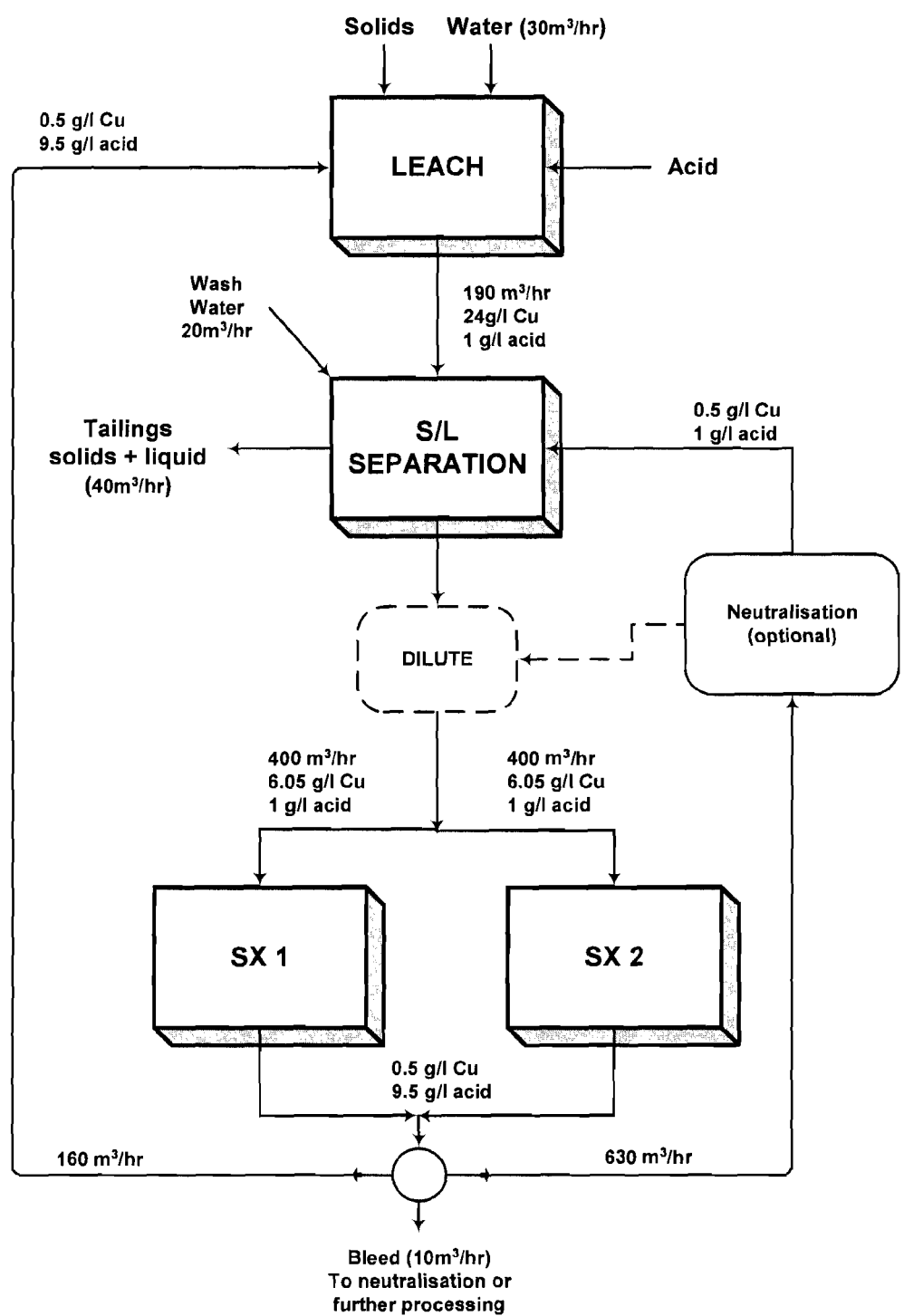
FIG. 1 is a process flow diagram representing a standard leaching/solvent extraction operation wherein all of the aqueous leach solution is treated in the same manner.

Other than in the operating examples, or where otherwise indicated, all numbers expressing quantities of ingredients or reaction conditions used herein are to be understood as modified in all instances by the term "about".

Aqueous leach pulps from agitation leaching operations comprise a mixture of leached solids (i.e., ore residues) and an aqueous leach solution. Aqueous leach solutions comprise water, a leaching agent and a metal. Aqueous leach solutions can additionally contain other metals, impurities, and residual leached solids. Aqueous leach pulps are obtained from the treatment of ground or milled ores with an aqueous solution of a leaching agent. The aqueous leach pulp then flows or is carried to further processing and solvent extraction. The manner in which the aqueous leach pulp, or any other solution, stream or raffinate is conveyed during the processes according to the present invention is inconsequential. In general, pulps, solutions, streams and raffinates may be conveyed by pipe or any other natural or man-made conduit.

In accordance with the present invention, a first aqueous leach pulp is subjected to a solid-liquid separation to remove at least some of the leached solids which are present therein. The first aqueous leach pulp is divided into two or more portions by subjecting the aqueous leach pulp to a solid-liquid separation, such as a decantation-clarifier or filtering, to provide a first portion or first clarified aqueous leach solution and a second portion or second aqueous leach pulp, wherein the second pulp contains leached solids at a higher % solids level than the first aqueous leach pulp. Essentially, the solid-liquid separation is used to divide the solution into the two portions for separate solvent extraction. The first portion is a clarified or partially clarified leach solution while the second portion is a combination of leach liquor and leached solids at a higher solids content than the first aqueous leach pulp. The clarified or partially clarified leach solution advances to solvent extraction while the second portion advances to a counter current decantation wash circuit or to another type of solid-liquid separation that includes some washing of the solids.

In general, each solid-liquid separation can be carried out in any known manner. Any method for separating solids from liquids can be employed. The manner in which solid-liquid extraction is carried out is not critical. For example, solids can be separated from liquids by methods including, but not limited to, decantation and/or filtration. Decantation is preferred.

The processes according to the present invention can be used in any metal recovery operation which employs an aqueous agitation leaching operation where the leaching agent is regenerated in the solvent extraction process. Thus, the processes according to the present invention can be applicable to any metal leached by an aqueous solution. Such metals include the transition metals. The processes according to the present invention are preferably employed in the leaching of metals which occur naturally as oxide and/or sulfide ores. The processes according to the present invention are most preferably used in the leaching of divalent metal ores. Such metals include copper, zinc, cobalt and nickel. The processes according to the present invention are most preferably used in the leaching of copper.

The aqueous leach solutions treated in the processes according to the present invention contain a leaching agent which is capable of leaching the metal from the ore with which they are previously contacted. The processes according to the present invention are applicable to leaching operations wherein an aqueous leaching agent is employed. In certain preferred embodiments of the present invention the leaching agent comprises sulfuric acid. In those preferred embodiments of the present invention where the metal comprises copper, it is further preferred that sulfuric acid be used as the leaching agent. Other leaching agents which can be used in processes according to the present invention include, but are not limited to acids such as hydrochloric acid, nitric acid, organic acids and combinations thereof, and basic substances such as ammonia. Essentially, any leaching agent which is water-miscible, capable of leaching the metal from the ore and which produces a water-soluble leaching agent-metal compound can be used.

In the processes according to the present invention, the first aqueous leach pulp is divided into at least two portions prior to any solvent extraction, a first clarified leach solution and a second aqueous leach pulp containing a greater % solids than the first aqueous leach pulp. Division of the first aqueous leach pulp can be accomplished via any known process of splitting a leach pulp into two or more separate streams or volumes. In general, the first aqueous leach pulp is divided into two portions. The first clarified leach solution is subjected to solvent extraction prior to any significant dilution and the second aqueous leach pulp is taken through a dilution wash circuit to produce a diluted second clarified leach solution which is then subjected to solvent extraction. However, the clarified aqueous leach solutions can be divided into more than two streams, for example, where multiple circuits are running in parallel. For example, the first clarified leach solution can be further divided into two portions which proceed to two solvent extraction plants without any significant dilution while the second leach pulp undergoes a solid-liquid separation to give one stream of a second clarified leach solution which then proceeds to one solvent extraction plant or vice versa. In a similar manner the first clarified leach solution can be further divided into two portions which proceed to two separate solvent extraction plants and the second clarified aqueous leach solution could also be divided into two separate streams which proceed to two separate solvent extraction plants. The way the leach solutions are divided will depend on many factors such as the metal content of the original leach solution, the design of the solvent extraction plant, the response of the leach solids to solid-liquid separation and the total flow of leach solution to be treated. The important feature of the division of the leach solution is to take as much of the metal that is leached to the first solvent extraction plant(s) so as to maximize the regeneration of the leaching agent. Added division of the leach solution can occur where volume and capacity require.

The division of the aqueous leach solution in accordance with the processes of the present invention can be done evenly or such that one portion contains a greater volume than the other. In certain preferred embodiments of the present invention, the dividing of the aqueous leach solution is carried out such that the volume of the leach solution present in the portion which is subjected to solvent extraction prior to any significant dilution is greater than the volume of leach solution present in the portion which is diluted prior to solvent extraction.

As used herein, the term "significant dilution" refers to the addition of a measurable amount of water or other aqueous solution to an aqueous leach solution. Accordingly, significant dilution of the second aqueous leach pulp refers to the addition of water or other aqueous solution to the second aqueous leach pulp in an amount such that the concentration of metal in the first clarified aqueous leach solution is greater than the concentration of the metal in the second clarified aqueous leach solution. In preferred embodiments of the present invention, the concentration of metal in the first clarified aqueous leach solution is at least 10% greater than the concentration of the metal in the second clarified aqueous leach solution. In increasingly more preferred embodiments of the present invention, the concentration of metal in the first clarified aqueous leach solution is at least 20% greater, at least 30% greater, at least 40% greater, at least 50% greater, at least 60% greater, at least 70% greater, at least 80% greater, at least 90% greater, at least 100% greater, at least 200% greater, at least 300% greater, at least 400% greater, at least 500% greater, or even higher than the concentration of the metal in the second clarified aqueous leach solution. In the most preferred embodiments of the present invention, the first clarified aqueous leach solution is subjected to solvent extraction without any dilution. However, it is to be understood that water or other aqueous solution can be added to the first clarified aqueous leach solution prior to the first solvent extraction, but only in such amounts that the concentration of metal in the first clarified aqueous leach solution prior to solvent extraction remains greater than the concentration of the metal in the second clarified aqueous leach solution. However, as increasing dilution of the first clarified aqueous leach solution decreases leaching agent recovery, less dilution is preferred.

Solvent extraction in accordance with the processes of the present invention can be carried out in any known manner wherein aqueous leach solution is contacted with an organic phase containing a metal-specific extraction reagent. Each extraction performed in accordance with the present invention can be carried out by mixing the organic phase and the aqueous leach agent and allowing the two phases to settle. This mixing-settling can be carried out in multiple series of mixing-settling tanks with countercurrent flow of the aqueous and non-aqueous phases.

The aqueous phase resulting from a solvent extraction operation is referred to as a raffinate. In the processes according to the present invention, the first portion of the aqueous leach solution is subjected to solvent extraction prior to any significant dilution and a first aqueous raffinate is obtained. In the processes according to the present invention, the second portion of the aqueous leach solution is diluted with an aqueous stream and then subjected to a separate solvent extraction and a second aqueous raffinate is obtained. The first raffinate produced in accordance with the processes of the present invention will generally have a leaching agent concentration which is greater than the concentration of leaching agent present in the second raffinate. In preferred embodiments of the present invention, the first raffinate will have a leaching agent concentration which is at least 10% greater than the concentration of leaching agent present in the second raffinate. In certain increasingly more preferred embodiments of the present invention, the first raffinate will have a leaching agent concentration which is at least 20% greater, 30% greater, 40% greater, 50% greater, 60% greater, 70% greater, 80% greater, 90% greater, 100% greater, 200% greater, or more than the concentration of leaching agent present in the second raffinate.

In the processes according to the present invention, the second aqueous leach pulp is diluted prior to being subjected to solvent extraction. The second aqueous leach pulp is diluted with an aqueous stream. The aqueous stream for diluting the second aqueous leach pulp can comprise fresh water introduced into the process, at least a portion of the aqueous raffinate from another solvent extraction plant, at least a portion of the second aqueous raffinate, or a combination thereof. In certain preferred embodiments of the present invention, the second aqueous leach pulp is diluted with at least a portion of the second aqueous raffinate. Where the leaching agent comprises an acid, the second aqueous raffinate can be at least partly neutralized prior to its use for diluting the second aqueous leach pulp. Neutralization can be accomplished via the addition of any basic substance. In those embodiments wherein the leaching agent comprises sulfuric acid, lime is preferred for neutralization. Neutralization need not be complete. A suitable pH range for the partly neutralized second aqueous raffinate prior to its use for dilution is any pH up to about 8.

In the processes according to the present invention, a portion of the second aqueous raffinate may be bled from the circuit to maintain water balance. Additionally, in certain preferred embodiments of the present invention, at least a portion of the first aqueous raffinate is recycled to a leaching operation where the leaching agent contained therein is employed to leach more metal from ore. In more preferred embodiments, at least a portion of the first aqueous raffinate is recycled to the same leaching operation from which the aqueous leach solution was obtained. In certain other preferred embodiments of the present invention, at least a portion of the second aqueous raffinate is recycled to a leaching operation where the leaching agent contained therein is employed to leach more metal from ore. In more preferred embodiments, at least a portion of the second aqueous raffinate is recycled to the same leaching operation from which the aqueous leach solution was obtained. In even more preferred embodiments of the present invention at least a portion of both the first and the second aqueous raffinates are recycled to a leaching operation where the leaching agent contained therein is employed to leach more metal from ore. In still yet more preferred embodiments, at least a portion of both the first and the second aqueous raffinates are recycled to the same leaching operation from which the aqueous leach solution was obtained.

FIG. 1 depicts a process flow diagram of a standard, prior art agitation leach process for copper followed by solvent extraction. The leach pulp exiting leaching (LEACH), about 190 cubic meters/hour, is mixed in counter current decantation (S/L SEPARATION) with about 630 cubic meters/hour of recycled raffinate from the dual copper solvent extraction plants (SX 1 & SX 2). Neutralization of the recycled raffinate is optional. In this way the copper concentration is diluted from about 24 g/l Cu to about 6.0 g/l Cu prior to being fed to the solvent extraction circuit. The solvent extraction circuit consists of 2 separate plants or trains labeled SX 1 and SX 2, respectively, with each plant treating about 400 cubic meters/hour of aqueous solution flow. The raffinate exiting the solvent extraction plants are combined and then a portion of this solution (about 160 cubic meters/hour) is recycled to the leaching vessel where the acid in the leach solution is used to dissolve the copper. A second portion of this solution is recycled to the counter current solid-liquid separation operation where it is used to wash the leach solution from the leached solids so as to minimize metal losses to the leached solids that are eventually disposed to tailings. A small portion of fresh water may be added to the overall leach/wash system or a small portion of aqueous solution may be bled from the overall leach/wash system to maintain a water balance.

Figure 2:
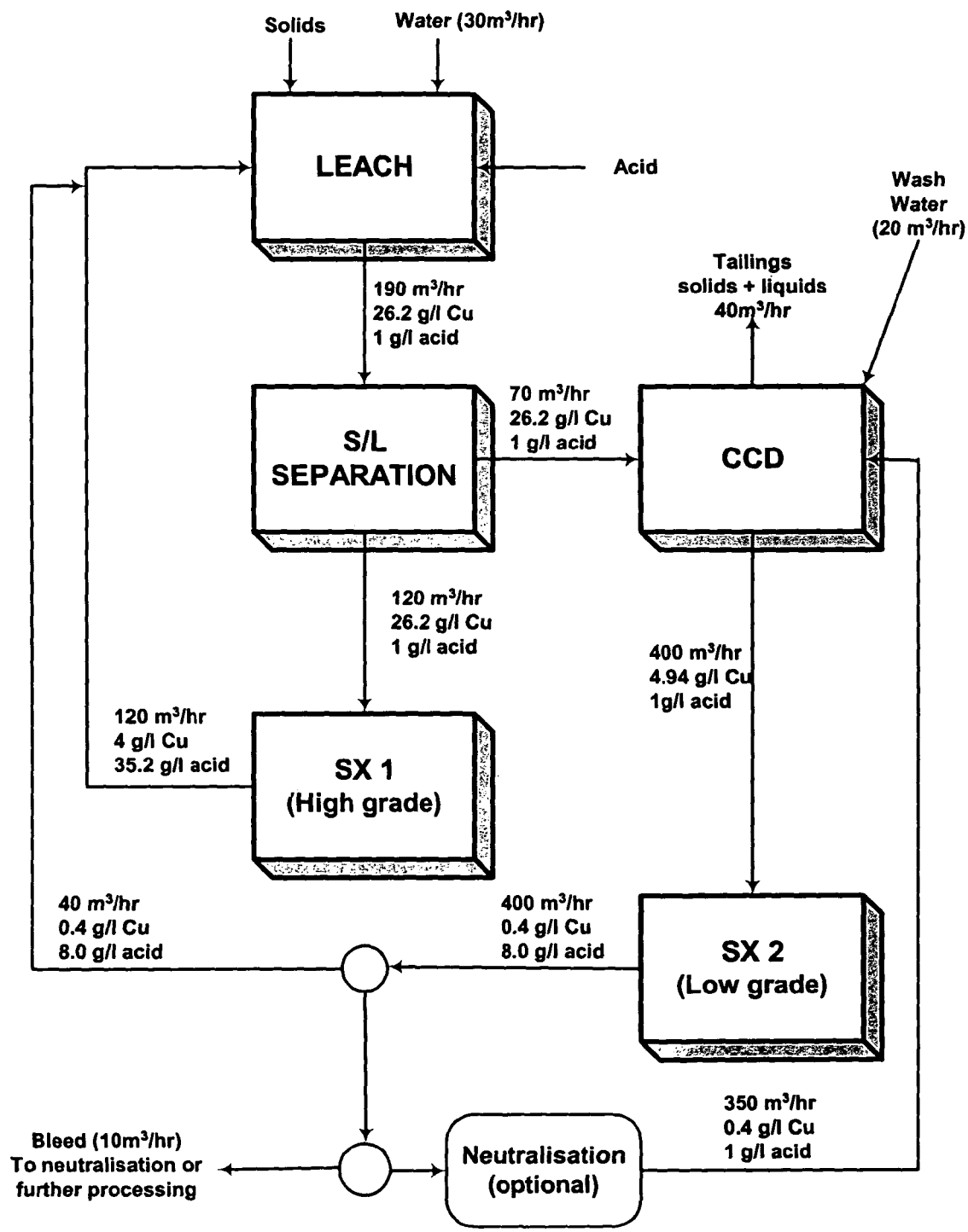
FIG. 2 is a process flow diagram representing a preferred embodiment of the present invention wherein an aqueous leach solution is divided into two portions and subjected to solvent extraction under two different sets of conditions.

FIG. 2 depicts a process flow diagram of a leaching process for copper followed by solvent extraction according to a preferred embodiment of the present invention. The aqueous leach pulp exiting the leach vessel (LEACH), about 190 cubic meters/hour, passes through an initial solids-liquid separation (S/L SEPARATION). Then about 120 cubic meters/hour of this solution containing about 26.2 g/l Cu is taken directly to solvent extraction (SX 1) where the copper is extracted and sulfuric acid is produced. SX 1 will reasonably produce a raffinate containing about 4 g/l Cu and 35 g/l acid. This solution is then recycled back to leaching. The aqueous portion of the leach solution remaining in the leach solution pulp that has exited the initial solid-liquid separation that does not proceed to SX 1 (about 70 meters cubed/hour) is taken to a counter current decantation (CCD) where it is mixed with about 350 cubic meters/hour of raffinate from SX 2 that has been optionally, partially neutralized. Then about 400 meters cubed of leach solution from the CCD circuit containing 4.94 g/l Cu is taken to SX 2 to give a raffinate containing 0.4 g/l Cu and 8 g/l acid. A small portion of raffinate from SX 2 may be bled from the circuit to maintain water balance. Additionally about 40 meters cubed/hour of raffinate from SX 2 is returned to the leaching vessel.

One advantage of the process according to the present invention is that much more acid is returned to leaching than with the standard process. For example, by comparing the standard process depicted in FIG. 1 with the preferred embodiment of the present invention depicted in FIG. 2, it can be seen that in the standard process, 160 meters cubed/hour of raffinate containing about 9.5 g/l sulfuric acid is returned to the leaching vessel bringing with it about 1.52 metric tons of acid per hour. In the process according to a preferred embodiment of the invention, 120 meters cubed/hour of raffinate from SX 1 and 40 meters cubed/hour of raffinate from SX 2 are returned to the leaching vessel bringing a total of about 4.54 tons of acid back to leaching. This represents a savings of about 3.02 tons of acid/hour or about 72.5 tons of acid/day.

A second advantage of the process according to the present invention is realized in the neutralization of the recirculating raffinate if neutralization is needed. For example, by comparing the standard process depicted in FIG. 1 with the preferred embodiment of the present invention depicted in FIG. 2, it can be seen that in the standard process about 630 meters cubed/hour of solution containing about 9.5 g/l acid is neutralized while in the process according to a preferred embodiment of the present invention, about 350 cubic meters/hour of solution containing about 8 g/l acid is neutralized. This results in the need for significantly less neutralization agent for the practice of this invention over standard practice.

A third advantage of the process according to the present invention is that the bleed with the process according to the invention may in fact contain less metal than the bleed with the normal configuration. FIG. 1 shows that the bleed for the normal circuit will contain about 0.5 g/l Cu and 9.5 g/l $H_2SO_4$ while the bleed in the process according to the preferred embodiment of the invention depicted therein will contain only about 0.4 g/l Cu and 8 g/l $H_2SO_4$. In fact because the feed to SX 1 and SX 2 in the standard process has about 6.05 g/l Cu while the feed to SX 2 in the preferred embodiment of the inventive process depicted in FIG. 2 has about 4.94 g/l it is readily apparent to one skilled in the art that SX 2 in the process according to the invention will produce a raffinate lower in copper than either SX 1 or SX 2 in the standard process.

A fourth advantage of the split circuit design pertains to copper solvent extraction plants where a component of value in the bleed is recovered, for example cobalt. In most cases the bleed must be neutralized prior to cobalt recovery. Neutralization with a soluble base such as caustic or ammonia is very expensive therefore the lower the acid content of the bleed stream the lower the amount of base needed for neutralization. Furthermore the use of a solution of caustic for neutralization adds water to the bleed stream thereby diluting the valuable cobalt stream. Alternatively neutralization can take place with lime or limestone which is a less costly base. In this case a lesser amount of acid in the bleed stream requires less lime or limestone for neutralization and in the process a lesser amount of gypsum precipitate is produced. Gypsum must be removed from the system and all the solution containing the valuable metal must be recovered. A lesser amount of gypsum allows the use of smaller equipment for the solid-liquid separation. When finely divided solids are separated from a liquid the solids will always contain some of the liquid. In the case under discussion the lesser amount of gypsum will contain a lower volume of the neutralized bleed stream which contains the valuable second component, for example cobalt. Thus the ultimate recovery of the valuable component in the bleed stream is higher when using the process according to the invention.

The present invention will now be illustrated in more detail by reference to the following specific, non-limiting examples.

COMPARATIVE EXAMPLE A & EXAMPLE B

In Comparative Example A, based on FIG. 1, an aqueous leach solution is obtained from a leaching operation that produces about 190 cubic meters/hour of leach solution containing 24 g/l Cu and about 1 g/l sulfuric acid. This leach solution is mixed with a high volume of recycled and optionally, partially neutralized raffinate, 630 cubic meters/hour containing 0.5 g/l Cu and about 1 g/l sulfuric acid, to produce an aqueous solution of about 800 cubic meters/hour containing about 6.05 g/l Cu and about 1 g/l sulfuric acid. The 800 cubic meters/hour of solution is split into two equal streams and each stream is then fed to copper solvent extraction plant. Copper extraction isotherms followed by computer modeling show that the copper solvent extraction can be expected to produce a raffinate containing about 0.5 g/l Cu and about 9.5 g/l sulfuric acid. This represents a copper recovery of 91.7% which is well within the recovery that can be expected in a commercial copper solvent extraction plant.

In Comparative Example A, 160 cubic meters of raffinate containing 9.5 g/l sulfuric acid would return to leaching carrying 1.52 metric tons of acid per hour to leaching.

In Example B, based on FIG. 2, an aqueous leach solution is obtained from a leaching operation that produces 190 cubic meters of leach solution containing 26.2 g/l Cu and about 1.0 g/l sulfuric acid. This leach solution goes directly to a solid-liquid separation which occurs in a clarifier using decantation. Then about 120 cubic meters of the clarified leach solution is taken to a first solvent extraction plant where copper is extracted and sulfuric acid is produced. Extraction isotherms and computer modeling show that a raffinate containing about 4 g/l Cu and about 35.2 g/l sulfuric acid can easily be produced by advancing 400 cubic meters of organic flow using a reagent concentration of about 25 to 30 volume % reagent. In this case the acid returned to leaching in the 120 cubic meters of raffinate is about 4.22 metric tons/hour.

Also, in Example B, an additional 40 cubic meters of recycled aqueous solution containing about 8.0 g/l sulfuric acid is returned to leaching. This brings an additional about 0.32 tons acid/hour to leaching. Thus the total acid returned to leaching using a process according to this preferred embodiment of the present invention is about 4.54 tons per hour.

A simple calculation shows that for this example the acid savings using the split circuit are about 4.54 metric tons/hour less 1.52 metric tons/hour =about 3.02 metric tons/hour or about 72.5 metric tons acid/day. Acid costs vary widely from as low as US$ 15/ton to above US$ 150/ton depending on the location. For low cost-acid, the savings would be about US$ 1088/day, while for high cost-acid the savings would be about US$ 10,880/day or higher.

In Comparative Example A, the neutralization of the acid is carried out on a large portion of the recycled raffinate that does not proceed directly to leaching, but, rather is used to dilute the leach solution prior to solvent extraction. About 630 cubic meters of raffinate flow is taken to neutralization. Additionally, a bleed of the raffinate prior to neutralization is needed to maintain water balance in the circuit and can be as high as 20 to 25% or as low as only a few % of the flow of the leach solution exiting the leaching vessel. In Comparative Example A, there is a bleed of 10 meters cubed/hour and a raffinate stream to be neutralized of 630 cubic meters/hour. The raffinate contains about 0.5 g/l Cu and about 9.5 sulfuric acid. When this raffinate is neutralized to a pH of about 1.8 it will contain about 1 g/l sulfuric acid so the total acid neutralized is about 5.36 metric tons/hour (630 cubic meters/hour× 8.5 kilos acid/cubic meter).

In Example B, the total raffinate taken to neutralization is about 350 meters/cubed hour containing about 8.0 g/l sulfuric acid. Upon neutralization to a pH of 1.8, the total acid neutralized is about 2.45 metric tons/hour (350 cubic meters/ hour×7.0 kilos acid/cubic meter). The savings in neutralization are about 2.91 metric tons acid per hour (5.36 less 2.45). This is a significant improvement because less acid needs to be neutralized. Less acid neutralization means that smaller equipment is needed for neutralization and less base is needed for the neutralization. Using lime as the neutralization agent in Comparative Example A produces more than twice the amount of precipitated gypsum as the neutralization of acid with lime in Example B. Thus the equipment needed for neutralization and the equipment needed for the solid-liquid separation after neutralization will be more than twice in size in Comparative Example A than in Example B.

In Example B, further savings in neutralization are realized because the leached tailings slurry exiting the solid-liquid separation must be neutralized to a pH of about 7 to 7.5. In Comparative Example A, the water contained in the leached tailings may contain up to about 7.5 g/l sulfuric acid. In Example B, the water contained in the leached tailings may contain up to about 6.5 g/l sulfuric acid.

In addition the water exiting the CCD circuit with the washed solids (40 meter cubed per hour) contains 0.8 g/l Cu in the standard practice while the same amount of water in the practice of this invention only contains 0.6 g/l Cu. Thus for the exact same amount of copper ore leached the practice of the present invention will produce about 192 kilos of copper more per day (40×0.2×24).

The bleed from the example under consideration is 10 cubic meters/ hour. In the standard practice this bleed contains about 0.5 g/l Cu while the bleed in the practice of this invention only contains about 0.4 g/l Cu. Thus the copper lost in the bleed for the standard practice is about 1 kilo of copper per hour. more than the copper lost in the bleed for the practice of this invention. For a small bleed the difference in copper lost in the standard practice compared to the practice of this invention is quite small but for a plant that has a 20% to 25% bleed the difference in copper lost can be significant.

In reference to optional neutralization of recycled raffinate it will be appreciated by those skilled in the art that the level of neutralization is dependent on the acid consumed by the leached solids as the leached solids proceed through the solid-liquid separation. In some cases considerable acid will be consumed during the solid-liquid separation and little or no neutralization of the recycled raffinate will be needed. In other cases only small amounts of acid may be consumed during solid-liquid separation and neutralization of the recycled raffinate may be more extensive.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A process comprising:
   (a) providing a first aqueous leach pulp obtained from an acid consuming agitation leaching process, wherein the first aqueous leach pulp comprises a mixture of leached solids and an aqueous leach solution comprising copper, acid and water;
   (b) subjecting the first aqueous leach pulp to a first solid-liquid separation to provide a first clarified aqueous leach solution and a second aqueous leach pulp, wherein the second aqueous leach pulp comprises the leached solids at a % solids level greater than the first pulp;
   (c) subjecting the first clarified aqueous leach solution to a first solvent extraction prior to any significant dilution, whereby a first aqueous raffinate is obtained;
   (d) subjecting the second aqueous leach pulp to a second solid-liquid separation with significant dilution via an aqueous stream to obtain a second clarified aqueous leach solution; and
   (e) subjecting the second clarified aqueous leach solution to a second solvent extraction whereby a second aqueous raffinate is obtained.

2. The process according to claim 1, wherein the leaching agent is sulfuric acid.

3. The process according to claim 1, wherein the volume of the aqueous leach solution in the first clarified aqueous leach solution is greater than the volume of the aqueous leach solution in the second aqueous leach pulp.

4. The process according to claim 1, wherein the aqueous stream for diluting the second aqueous leach pulp comprises the second aqueous raffinate.

5. The process according to claim 4, wherein the aqueous stream comprising the second aqueous raffinate is at least partly neutralized prior to dilution of the second aqueous leach pulp.

6. The process according to claim 1, wherein the second aqueous leach pulp is subjected to the second solid-liquid separation prior to dilution.

7. The process according to claim 1, wherein the second aqueous leach pulp is subjected to the second solid-liquid separation simultaneously with dilution.

8. The process according to claim 7, wherein the second solid-liquid separation comprises counter-current decantation.

9. The process according to claim 1, wherein the concentration of the metal in the first clarified aqueous leach solution is at least 10% greater than the concentration of the metal in the second clarified aqueous leach solution.

10. The process according to claim 1, wherein the concentration of the metal in the first clarified aqueous leach solution is at least 50% greater than the concentration of the metal in the second clarified aqueous leach solution.

11. The process according to claim 1, wherein the concentration of the metal in the first clarified aqueous leach solution is at least 100% greater than the concentration of the metal in the second clarified aqueous leach solution.

12. The process according to claim 1, wherein at least a portion of the first aqueous raffinate is recycled to a leaching process.

13. The process according to claim 1, wherein the first aqueous leach pulp is obtained from a leaching process and wherein at least a portion of the first aqueous raffinate is recycled to the leaching process.

14. The process according to claim 1, wherein at least a portion of the second aqueous raffinate is recycled to a leaching process.

15. The process according to claim 1, wherein the first aqueous leach pulp is obtained from a leaching process and wherein at least a portion of the second aqueous raffinate is recycled to the leaching process.

16. The process according to claim 1, wherein the first aqueous leach pulp is obtained from a leaching process and wherein at least a portion of the first aqueous raffinate and at least a portion of the second aqueous raffinate are recycled to the leaching process.

17. A process comprising:
 (a) providing a first aqueous leach pulp obtained from an acid consuming agitation leaching process, wherein the first aqueous leach pulp comprises a mixture of leached solids and an aqueous leach solution comprising copper, sulfuric acid and water;
 (b) subjecting the first aqueous leach pulp to a first solid-liquid separation to provide a first clarified aqueous leach solution and a second aqueous leach pulp, wherein the second aqueous leach pulp comprises the leached solids at a % solids level greater than the first pulp;
 (c) subjecting the first clarified aqueous leach solution to a first solvent extraction prior to any significant dilution, whereby a first aqueous raffinate is obtained;
 (d) subjecting the second aqueous leach pulp to a second solid-liquid separation with significant dilution via an aqueous stream to obtain a second clarified aqueous leach solution, wherein the concentration of the metal in the first clarified aqueous leach solution is at least 10% greater than the concentration of the metal in the second clarified aqueous leach solution;
 (e) subjecting the diluted second portion to a second solvent extraction whereby a second aqueous raffinate is obtained; wherein the aqueous stream for diluting the second aqueous leach pulp comprises at least a portion of the second aqueous raffinate; and
 (f) recycling at least a portion of the first aqueous raffinate and at least a portion of the second aqueous raffinate to the leaching process.

18. The process according to claim 17, wherein the concentration of the metal in the first clarified aqueous leach solution is at least 50% greater than the concentration of the metal in the second clarified aqueous leach solution.

19. The process according to claim 17, wherein the concentration of the metal in the first clarified aqueous leach solution is at least 100% greater than the concentration of the metal in the second clarified aqueous leach solution.

20. The process according to claim 1, wherein the second aqueous leach pulp is subjected to the second solid-liquid separation following dilution.

21. The process according to claim 1, wherein the first clarified aqueous leach solution proceeds directly from the first solid-liquid separation to a first solvent extraction.

22. The process according to claim 17, wherein the first clarified aqueous leach solution proceeds directly from the first solid-liquid separation to a first solvent extraction.

23. The process according to claim 17, wherein the aqueous leach solution of the first aqueous leach pulp comprises a copper oxide ore.

* * * * *